US012705251B2

(12) United States Patent
Inala et al.

(10) Patent No.: US 12,705,251 B2
(45) Date of Patent: Aug. 11, 2026

(54) CONTENT MANAGEMENT TOOL FOR CONTENT TRANSFORMATION

(71) Applicant: Microsoft Technology Licensing, LLC, Redmond, WA (US)

(72) Inventors: Jeevana Priya Inala, Hillsboro, OR (US); Gonzalo A. Ramos, Kirkland, WA (US); Nathalie M. Riche, Issaquah, WA (US); Chenglong Wang, Issaquah, WA (US); Priyan Vaithilingam, Boston, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/948,806

(22) Filed: Nov. 15, 2024

(65) Prior Publication Data

US 2026/0140964 A1 May 21, 2026

(51) Int. Cl.
*G06F 16/25* (2019.01)
*G06F 9/54* (2006.01)

(52) U.S. Cl.
CPC ............ *G06F 16/254* (2019.01); *G06F 9/543* (2013.01)

(58) Field of Classification Search
CPC ............................... G06F 16/254; G06F 9/543
See application file for complete search history.

(56) References Cited

U.S. PATENT DOCUMENTS

2019/0129939 A1 5/2019 Hewitt
2022/0236971 A1* 7/2022 Zhang .................... G06F 8/447

OTHER PUBLICATIONS

"Assistants API overview", Retrieved from: https://platform.openai.com/docs/assistants/overview, 2024, 2 Pages.
"Clipboard", Retrieved from: https://www.electronjs.org/docs/latest/api/clipboard, 2024, 8 Pages.
"GPT-4o mini: advancing cost-efficient intelligence", Retrieved from: https://openai.com/index/gpt-40-mini-advancing-cost-efficient-intelligence/, Jul. 18, 2024, 7 Pages.
"Olympic Games Tokyo 2020", Retrieved from: https://web.archive.org/web/20240729152542/https://olympics.com/en/olympic-games/tokyo-2020/athletes, 2020, 5 Pages.

(Continued)

*Primary Examiner* — Tyler J Torgrimson
(74) *Attorney, Agent, or Firm* — Alleman Hall LLP

(57) ABSTRACT

Systems and methods for capturing and transforming content from a source application to a destination application are provided. In particular, a computing device may detect a capture request to capture content from a source application, in response to the capture request, capture the content and source context associated with the source application, detect a paste request to paste captured content to a destination application, in response to the paste request, capture destination context associated with the destination application, generate code for transforming the captured content based at least upon the source context and the destination context, execute the generated code to transform the captured content, and provide the transformed content into the destination application.

20 Claims, 13 Drawing Sheets

(56) References Cited

OTHER PUBLICATIONS

Beaudouin-Lafon, Michel, "Instrumental Interaction: An Interaction Model for Designing Post-WIMP User Interfaces", Proceedings of the SIGCHI conference on Human Factors in Computing Systems, Apr. 1, 2000, 9 Pages.

Best, et al., "Generic ballot Polls", Retrieved from: https://web.archive.org/web/20240823073303/https://projects.fivethirtyeight.com/polls/generic-ballot/, Aug. 22, 2024, 4 Pages.

Best, et al., "National: President: general election: 2024 Polls", Retrieved from: https://web.archive.org/web/20240823042115/https://projects.fivethirtyeight.com/polls/president-general/2024/national/, Aug. 22, 2024, 5 pages.

Beyer, et al., "Contextual Design: Defining Customer-Centered Systems", Elsevier, Dec. 8, 1997, 497 Pages.

Bhattad, et al., "Cut-and-Paste Neural Rendering", Retrieved from: https://www.semanticscholar.org/paper/Cut-and-Paste-Neural-Rendering-Bhattad-Forsyth/c149b6c36f05ceaa7ef40745d934697f761f565b, Oct. 12, 2020, 5 Pages.

Boehner, et al., "How HCI interprets the probes", Proceedings of the SIGCHI Conference on Human Factors in Computing Systems, Apr. 29, 2007, pp. 1077-1086.

Douglas C. Engelbart, "Augmenting human intellect: a conceptual framework", Retrieved from: https://www.dougengelbart.org/pubs/papers/scanned/Doug_Engelbart-AugmentingHumanIntellect.pdf, Oct. 1, 1962, 144 Pages.

Gaver, et al., "Design: Cultural probes", Interactions, vol. 06, No. 01, Jan. 1, 1999, pp. 21-29.

Graham, et al., "Probes and Participation", Proceedings of the Tenth Anniversary Conference on Participatory Design, Oct. 1, 2008, pp. 194-197.

Horvitz, Eric, "Principles of mixed-initiative user interfaces", Proceedings of the SIGCHI conference on Human Factors in Computing Systems, May 1, 1999, pp. 159-166.

Hutchinson, et al., "Technology probes: inspiring design for and with families", Proceedings of the SIGCHI Conference on Human Factors in Computing Systems, Apr. 5, 2003, pp. 17-24.

Lafon, et al., "Generative Theories of Interaction", Retrieved from: ACM Transactions on Computer-Human Interaction, vol. 28, No. 06, Nov. 15, 2021, 54 Pages.

Reif, et al., "Sem Clip—Overcoming the Semantic Gap Between Desktop Applications", In Semantic Web Challenge, Nov. 13, 2007, 8 Pages.

Reif, et al., "Semantic Clipboard—Semantically Enriched Data Exchange Between Desktop Applications", Retrieved from: https://www.semanticscholar.org/paper/Semantic-Clipboard-Semantically-Enriched-Data-Reif-Gall/389679bd6c528bbac09a81d80886a79a4a71054d, Nov. 6, 2006, 13 Pages.

Scaffidi, et al., "Games Programs Play: Obstacles to Data Reuse", Conference on Human Factors in Computing Systems, Apr. 2006, 3 Pages.

Schilter, et al., "CMD+V for chemistry: Image to chemical structure conversion directly done in the clipboard", Applied AI Letters, Jan. 25, 2024, 7 Pages.

Spataro, Jared, "Introducing Microsoft 365 Copilot—your copilot for work", Retrieved from: https://blogs.microsoft.com/blog/2023/03/16/introducing-microsoft-365-copilot-your-copilot-for-work/, Mar. 16, 2023, 6 Pages.

Stolee, et al., "Revealing the copy and paste habits of end users", IEEE Symposium on Visual Languages and Human-Centric Computing (VL/HCC), 2009, pp. 59-66.

Stylos, et al., "Citrine: providing intelligent copy-and-paste", Proceedings of the 17th annual ACM symposium on User interface software and technology, Oct. 24, 2004, 10 Pages.

Tankelewitch, et al., "The Metacognitive Demands and Opportunities of Generative AI", Retrieved from: https://arxiv.org/abs/2312.10893, Mar. 12, 2024, 24 Pages.

Tesler Larry, "A personal history of modeless text editing and cut/copy-paste", Interactions, vol. 19, No. 04, Jul. 1, 2012, pp. 70-75.

Wikipedia, "GPT-4o", Retrieved from: https://en.wikipedia.org/wiki/GPT-40, 2024, 7 Pages.

Woodruff, et al., "Data transfer: A longitudinal analysis of clipboard and drag-and-drop use in desktop applications", International Journal of Human-Computer Studies, vol. 132, Dec. 2019, pp. 112-120.

Zhang, et al., "How do Data Science Workers Collaborate? Roles, Workflows, and Tools", Retrieved from: https://arxiv.org/abs/2001.06684, Apr. 16, 2020, 23 Pages.

Zhao, et al., "Auto Com Paste: Auto-Completing Text as an Alternative to Copy-Paste", In International Working Conference on Advanced Visual Interfaces, May 2012, 9 Pages.

International Search Report and Written Opinion received for PCT Application No. PCT/US2025/039562, mailed on Nov. 24, 2025, 14 pages.

* cited by examiner

| | A | B | C | D | E |
|---|---|---|---|---|---|
| 1 | User ID | Session Duration (mins) | Errors Encountered | Satisfaction Score (1-5) | Feedback |
| 2 | U001 | 12.5 | 2 | 4 | Very good experience, but had 2 errors |
| 3 | U002 | 8.7 | 0 | 5 | Excellent, smooth navigation |
| 4 | U003 | 15 | 3 | 3 | Too many errors, Frustrating |
| 5 | U004 | 10 | 1 | 4 | Overall good, but minor issues |
| 6 | U005 | 22.3 | 4 | 2 | Long session, too many problems |
| 7 | U006 | 7 | 0 | 5 | Great experience |
| 8 | U007 | 5.2 | 0 | 4 | Good, but felt a bit rushed |
| 9 | U008 | 18.5 | 3 | 2 | The design was confusing at times |
| 10 | U009 | 9.1 | 1 | 4 | Pretty good, but small bugs here and there |
| 11 | U010 | 13 | 2 | 3 | Decent, but errors were annoying |
| 12 | | | | | |
| 13 | | | | | |

Ctrl + C

FIG. 4A

```
import pandas as pd
# Reading the CSV file into a DataFrame
file_path = "<userdir>/tmp/202401204002-tmp.csv"
df = pd.read_csv(file_path)
# Display the DataFrame
print(df)|
```

MARKDOWN

```
# Students Scores

| Student | Assignment | Score |
| ........... | ............... | ......... |
| Alice | Assignment 1 | 85 |
| Bob | Assignment 1 | 90 |
| Charlie | Assignment 1 | 78 |
| Alice | Assignment 2 | 88 |
| Bob | Assignment 2 | 85 |
| Charlie | Assignment 2 | 82 |
| Alice | Assignment 3 | 92 |
| Bob | Assignment 3 | 88 |
| Charlie | Assignment 3 | 80 |
```

Ctrl + C

Ctrl + Shift + V

PREVIEW

Students Scores

| Students | Assignment | Score |
| --- | --- | --- |
| Alice | Assignment 1 | 85 |
| Bob | Assignment 1 | 90 |
| Charlie | Assignment 1 | 78 |
| Alice | Assignment 2 | 88 |
| Bob | Assignment 2 | 85 |
| Charlie | Assignment 2 | 82 |

Source Type : Text X

Pivot the table to show assignments as rows.

Enter

FIG. 5A

MARKDOWN

```
# Students Scores

| Assignment | Alice | Bob | Charlie |
| .................. | ... .... | ...... | ........... |
| Assignment 1 | 85 | 90 | 78 |
| Assignment 2 | 88 | 85 | 82 |
| Assignment 3 | 92 | 88 | 80 |
```

PREVIEW

Students Scores

| Assignment | Alice | Bob | Charlie |
| --- | --- | --- | --- |
| Assignment 1 | 85 | 90 | 78 |
| Assignment 2 | 88 | 85 | 82 |
| Assignment 3 | 92 | 88 | 80 |

FIG. 5B

| Region | 2022 (percent) | 2030 (percent) | 2050 (percent) |
| --- | --- | --- | --- |
| **Sub-Saharan Africa** | **1,152** (14.51%) | **1,401** (16.46%) | **2,094** (21.62%) |
| Northern Africa and Western Asia | **549** (6.91%) | **617** (7.25%) | **771** (7.96%) |
| Central Asia and **Southern Asia** | **2,075** (26.13%) | **2,248** (26.41%) | **2,575** (26.58%) |
| Eastern Asia and Southeastern Asia | **2,342** (29.49%) | **2,372** (27.87%) | 2,317 (23.92%) |
| Europe and **Northern America** | **1,120** (14.10%) | **1,129** (13.26%) | **1,125** (11.61%) |
| Latin America and **the Caribbean** | **658** (8.29%) | **695** (8.17%) | **749** (7.73%) |
| Australia and New Zealand | **31** (0.39%) | **34** (0.40%) | **38** (0.39%) |
| Oceania | **14** (0.18%) | **15** (0.18%) | **20** (0.21%) |
| World | **7,942** | **8,512** | **9,687** |

FIG. 6A

```
def extract_table(data):
    from bs4 import BeautifulSoup
    import re
    soup = BeautifulSoup(data['raw data'],html.parser' )
    table = soup,find ('table')
    extracted_data = [ ]
    for row in table.find_all('tr'):
        cells = row,find_all(['td','th'])
        extracted_row = [ ' ' , join(re.sub(r'(?!\\)%,'\%, cell.get_text()).split()) for cell in cells]
        extracted_data.append(extracted_row)
    return extracted_data
```

FIG. 6B

```
[
    [ 'Region', 2022 (percent)', '2030 (percent)', '2050 (percent)' ],
    [ 'Sub-Saharan Africa', '1,152 (14.51\\%), 1,401 (16.46\\%)', '2,094 (21.62\\)' ],
    [ 'Northern Africa and Western Asia', '549 (6.91\\%)', '617 (7.25\\%)', '771 (7.96\\%)' ],
    [ 'Central Asia and Southern Asia', '2,075 (26.13\\%)', '2,248 (26.41\\%)', '2,575 (26.58\\%)' ],
    [ 'Eastern Asia and Southeastern Asia', '2,342 (29.49\\%)', '2,372 (27.87\\%)', '2,317 (23.92\\%)' ],
    [ 'Europe and Northern America', '1,120 (14,101\\%)', '1,129 (13.26\\%)', '1,125 (11.61\\%)' ],
    [ 'Latin America and the Caribbean', '658 (8.29\\%)', '695 (8.17\\%)', '749 (7.73\\%)' ],
    [ 'Australia and New Zealand', '31 (0.39\\%)', '34 (0.48\\%)', '38 (0.391\\%)' ],
    [ 'Oceania, 14 (0.18\\%)', '15 (0.18\\%)', '20 (0.21\\%)' ],
    [ 'World', '7,942', '8,512', '9,687' ],
]
```

FIG. 6C

```
def array_to_latex_table(data):
    import pandas as pd
    array_data = data['structured_data']
    #Convert the 2D array to a pandas DataFrame
    df = pd.DataFrame(array_data[1:], columns=array_data[0])  # columns headers

    #Convert DataFrame to LaTeX table
    latex_table = df.to_latex(index=False)  # exclude row numbers
    return latex_table
```

FIG. 6D

```
\begin {tabular}{|c|c|c|c|}\hline
    Region & 2022 (percent) & 2030 (percent) & 2050 (percent) \\ \hline
    Sub-Saharan Africa & 1,152 (14.51\%) & 1,401 (16.46\%) & 2.094 (21.62\%) \\ \hine
    Northern Africa and Western Asia & 549 (6.91\%) & 617 (7.25\%) & 771 (7.96\%) \\ \hline
    Central Asia and Southern Asia & 2,075 (26.13\%) & 2,248 (26.41\%) & 2,575 (26.58\%) \\ \hline
    Eastern Asia and Southeastern Asia & 2,342 (29.49\%) & 2,372 (27.87\%) & 2,317 (23.92\%) \\ \hline
    Europe and Northern America & 1,120 (14.10\%) & 1,129 (13.26\%) & 1,125 (11.61\%) \\ \hline
    Latin America and the Caribbean & 658 (8.29\%) & 695 (8.17\%) & 749 (7.73\%) \\ \hline
    Australia and New Zealand & 31 (0.39\%) & 34 (0.40\%) & 38 (0.39\%) \\ \hline
    Oceania & 14 (0.18\%) &15 (0.18\%) & 20 (0.21\%) \\ \hline
    World & 7,942 & 8,512 & 9,687 \\ \hline
\end{tabular}
```

FIG. 6E

| Region | 2022 (percent) | 2030 (percent) | 2050 (percent) |
|---|---|---|---|
| Sub-Saharan Africa | 1,152 (14.51%) | 1,401 (16.46%) | 2094 (21.62%) |
| Northern Africa and Western Asia | 549 (6.91%) | 617 (7.25%) | 771 (7.96%) |
| Central Asia and Southern Asia | 2075 (26.13%) | 2,248 (26.41%) | 2, 575 (26.58%) |
| Eastern Asia and Southeastern Asia | 2,342 (29.49%) | 2,372 (27.87%) | 2,317 (23.92%) |
| Europe and Northern America | 1,120 (14.10%) | 1,129 (13.26%) | 1, 125 (11.61%) |
| Latin America and the Caribbean | 658 (8.29%) | 695 (8.17%) | 749 (7.73%) |
| Australia and New Zealand | 31 (0.39%) | 34 (0.40%) | 38 (0.39%) |
| Oceania | 14 (0.18%) | 15 (0.18%) | 20 (0.21%) |
| World | 7,942 | 8,512 | 9,687 |

FIG. 6F

CONTENT MANAGEMENT TOOL FOR CONTENT TRANSFORMATION

BACKGROUND

Computing devices include a variety of productivity tools and information that facilitate the accomplishment of a variety of tasks, including copying and pasting content between different devices and applications. For example, a clipboard tool allows users to copy and store content (e.g., image and text) from a source application and paste the copied content to a destination application. However, since traditional copy-and-paste approaches generally do not accommodate diverse representations adopted by different applications, users often spend considerable effort to reconstruct data formats and visual representations, making cross-app workflows costly. As such, it may be challenging for users to conveniently and efficiently transfer content data across applications, where transformation and/or (re)formatting of the copied content may be required before it is usable within the destination application.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

In accordance with at least one example of the present disclosure, a method for capturing and transforming content from a source application to a destination application is provided. The method may include detecting a capture request to capture content from a source application, in response to the capture request, capturing the content and source context associated with the source application, detecting a paste request to paste captured content to a destination application, in response to the paste request, capturing destination context associated with the destination application, generating code for transforming the captured content based at least upon the source context and the destination context, executing the generated code to transform the captured content, and providing the transformed content into the destination application.

In accordance with at least one example of the present disclosure, a computing device for capturing and transforming content from a source application to a destination application is provide. The computing device comprising a processor and a memory having a plurality of instructions stored thereon that, when executed by the processor, causes the computing device to detect a capture request to capture content from a source application, in response to the capture request, capture the content and source context associated with the source application, detect a paste request to paste captured content to a destination application, in response to the paste request, capture destination context associated with the destination application, generate code for transforming the captured content based at least upon the source context and the destination context, execute the generated code to transform the captured content, and provide the transformed content into the destination application.

In accordance with at least one example of the present disclosure, a computer-readable medium storing instructions for capturing and transforming content from a source application to a destination application is provided. The instructions when executed by one or more processors of a computing device, cause the computing device to: detect a capture request to capture content from a source application, in response to the capture request, capture the content and source context associated with the source application, detect a paste request to paste captured content to a destination application, in response to the paste request, capture destination context associated with the destination application, generate code for transforming the captured content based at least upon the source context and the destination context, execute the generated code to transform the captured content, and provide the transformed content into the destination application.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

FIGS. 4A-4D depict screenshots of user interface elements of the content management tool in accordance with examples of the present disclosure;

FIGS. 5A and 5B depict screenshots of user interface elements of the content management tool in accordance with examples of the present disclosure;

FIGS. 6A-6F depict screenshots of user interface elements of the content management tool in accordance with examples of the present disclosure;

DETAILED DESCRIPTION

Figure 1:
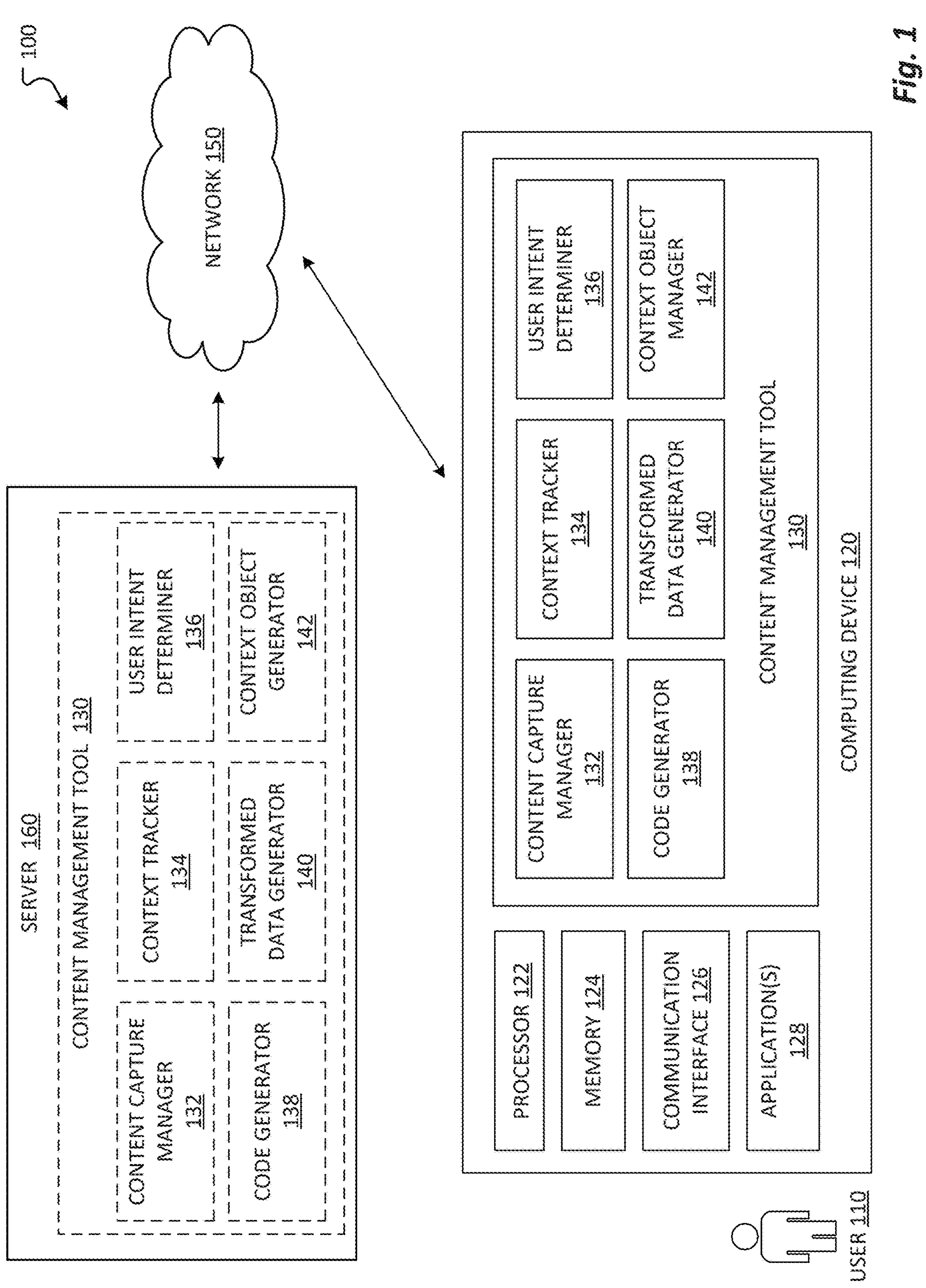
FIG. 1 depicts a block diagram of an example of an operating environment in which a content management tool may be implemented in accordance with examples of the present disclosure.

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Computing devices include a variety of productivity tools and information that facilitate the accomplishment of a variety of tasks, including copying and pasting content between different devices and applications. For example, a clipboard tool allows users to copy and store content (e.g., image and text) from a source application and paste the copied content to a destination application. However, since traditional copy-and-paste approaches generally do not accommodate diverse representations adopted by different applications, users often spend considerable effort to reconstruct data formats and visual representations, making cross-app workflows costly. As such, it may be challenging for users to conveniently and efficiently transfer content data across applications, where transformation and/or (re)formatting of the copied content may be required before it is usable within the destination application.

This challenge arises as the result of the distinct ways data is represented across the applications (e.g., HTML tables in websites, typeset tables in LaTex, data arrays in Python Notebook, custom table objects in the spreadsheet application, etc.) and simple copy-and-paste actions or moving data by exporting/importing common file formats (e.g., .csv files) often do not carry the structure and formats of the table from the source application to its destination. For example, when a user copies a web table and pastes it into the spreadsheet application, the result loses its original structure, let alone its format (e.g., conditional formatting) and the user needs to manually typeset the table to restore its structure. Such manual efforts are bothersome for users and may become a barrier for users to use certain applications together despite potential benefits (e.g., moving a financial table represented as a pivot table with multiple levels of header in the spreadsheet application to R for statistical analysis, which requires tidy data formats).

In accordance with examples of the present disclosure, a content management tool allows users to transform and move content across diverse applications. To do so, the content management tool transforms and (re)formats the content with minimal interruption by leveraging source and destination application contexts and user-specified instructions in natural language to automatically extract, parse, transform, and (re)format data from one application to another. For example, as the user copies data (e.g., with shortcut ctrl-c) from a source application and pastes it into a destination application (e.g., using the shortcut ctrl-shift-v), a dialog box may be presented via which the user can provide a brief explanation of the paste requirements, and the content management tool automatically generates code to transform and/or format the data based on both the user instructions and the source and destination application contexts, to make it ready to use at the destination application.

It should be appreciated that since copy-and-paste is a universal action that generalizes across applications, users can invoke and utilize the content management tool in a wide range of applications in a uniform manner, even if the applications have very different User Interfaces (UIs) and data representations. Additionally, unlike application-centric AI tools that can only access inputs provided by the user, the content management tool can keep track of context across applications (triggered when copy and paste actions are taken), thus the user does not need to write a verbose prompt to re-describe the format of the original data or destination format requirement—they may instead write a brief prompt to elaborate additional transformation goals they want to apply.

FIG. 1 depicts a block diagram of an example of an operating environment 100 in which a content management tool may be implemented in accordance with examples of the present disclosure. To do so, the operating environment 100 includes a computing device 120 associated with the user 110. The operating environment 100 may further include one or more remote devices, such as a productivity platform server 160, that are communicatively coupled to the computing device 120 via a network 150. The network 150 may include any kind of computing network including, without limitation, a wired or wireless local area network (LAN), a wired or wireless wide area network (WAN), and/or the Internet.

The computing device 120 includes a content management tool 130 executing on a computing device 120 having a processor 122, a memory 124, and a communication interface 126. The content management tool 130 allows the user 110 to copy-transform-paste content. To do so, the content management tool 130 integrates with or otherwise accesses an operating-system (OS) clipboard of the computing device 120. It should be appreciated that, in some embodiments, the content management tool 130 may be any productivity tool that integrates with the OS clipboard and has copy-and-paste and transformation functionalities. The content may be one or more texts, documents, images, pictures, photos, videos, or audios. Additionally, the computing device 120 may be, but is not limited to, a computer, a notebook, a laptop, a mobile device, a smartphone, a tablet, a portable device, a wearable device, or any other suitable computing device that is capable of executing the content management tool 130. It should be appreciated that the content management tool 130 is invoked via an operating system (OS)-level action triggered along with the user's copy (ctrl-c) and paste (ctrl-shift-v) inputs. To do so, the content management tool 130 further includes a content capture manager 132, a context tracker 134, a user intent determiner 136, a code generator 138, a transformed data generator 140, and a context object manager 142.

The content capture manager 132 is configured to receive a capture request to capture content. The capture request is any indicator that represents a user intent to capture the content. The content may be one or more texts, documents, images, pictures, photos, videos, or audios. The capture request may be a shortcut and/or a gesture assigned by an operating system or by a user. For example, a keyboard shortcut for a content capture (e.g., ctrl-c) may be predefined by an operating system of a user's computing device and/or by a user. Additionally, or alternatively, the capture request may be invoked via a tool bar icon or a menu item (e.g., Edit>copy). Additionally, or alternatively, a voice shortcut for a content capture (e.g., "capture selected content") may be predefined by an operating system of a user's computing device and/or by a user. Additionally, or alternatively, a user may assign a gesture as a capture request. For example, a user may indicate that whenever the user takes a screenshot on the user's mobile device, the user wants the screenshot to be captured. In other words, the user may define one or more rules or action-based-rules as the capture request for capturing content. Additionally, in some embodiments, upon detecting the capture request, a dialog box with an input area is presented to a user for receiving any additionally context related to the copied content and/or the source application.

Additionally, the content capture manager 132 is configured to determine if a paste request is received to paste the captured content at a destination application. The paste request may be a shortcut and/or a gesture assigned by an operating system or by a user. For example, a keyboard shortcut for a content capture (e.g., ctrl-shift-v) may be predefined by an operating system of a user's computing device and/or by a user. Additionally, or alternatively, the paste request may be invoked via a tool bar icon or a menu item (e.g., Edit>paste). Additionally, or alternatively, a voice shortcut for a content capture (e.g., "paste selected content") may be predefined by an operating system of a user's computing device and/or by a user. Additionally, or alternatively, a user may assign a shortcut or gesture as a paste request. In response to receiving the paste request, the content capture manager 132 is configured to paste the captured content that was most recently captured and transformed. It should be appreciated that the destination application is different from the source application where the content was originally copied from. For example, the user may copy the content from a website and paste the transformed content to an email. However, in some embodiments, the destination application may be the same as the source application. In other words, a user may copy the content and trigger a paste action to perform transformation of the copied content without having to add an extra step of opening an intermediate tool or application for transformation. In response to receiving the paste request, the content capture manager 132 is configured to paste the captured content into the destination application.

The context tracker 134 is configured to track application contexts for copy-paste actions. Specifically, the context tracker 134 is configured to keep track of the implicit context of the source application where the user copied the latest content data and the destination application where the paste was triggered. For example, the source context of a source application includes the name of the source application, the icon, the process ID, or any relevant application information associated with the source application. The destination context of a destination application includes the name of the destination application, the icon, the process ID, or any relevant application information associated with the destination application. For example, when the user copies a table from a web page in a web browser application, the context tracker 134 is aware and keeps track of the application name of the web browser application, the tab name, etc. Subsequently, if the user triggers the paste in a LaTex editor application, the context tracker 134 will automatically determine the destination context associated with the LaTex editor application. Additionally, in some examples, the context tracker 134 may be further configured to track more context from the source and destination applications (e.g., screenshots) and use that information to further reduce prompt burden. For example, if a user wants to paste a table that is similar to other tables in a document, the context tracker 134 is configured to gather information related to the document automatically. As described further below, the source and destination contexts are used to determine a type of data copied and how to extract structured data and metadata associated with the copied data.

The user intent determiner 136 is configured to receive user instruction for data transformation. For example, in response to detecting a paste request, a dialog box with an input area for an optional instruction prompt is presented to a user. The user can either give a paste instruction or just paste without any instructions. As described further below, the content management tool 130 is configured to automatically identify the best format supported for the destination application (e.g., based on the destination application context) and apply the paste. Since the content management tool 130 is attached to the OS clipboard, it can support all the formats supported by the clipboard (e.g., plain-text, RTF, HTML, and Images). For example, a user may provide an instruction in natural language on how to transform the captured content (e.g., "preserve the table colors," "remove all the citations, links, and icons," "bold the highest accuracy values in each row"). The user instruction may be received via a user interface element (e.g., a dialog box) of the content management tool 130. In some embodiments, the user instruction may be received via a voice command. In certain embodiments, a preview of the copied content is shown to the user while the user is entering the user instruction. However, it should be appreciated that, in some examples, a user may not provide any user instruction.

The code generator 138 is configured to generate code for transforming the captured content based on any user instruction, the source context, and the destination context. The generated code may be in any programming language (e.g., Python, C #, Typescript, etc.). As described further below, the code is executed to extract structured data and metadata associated with the captured content and to perform one or more transformations. For example, one or more transformation functions are generated based on the user instruction and the source and destination contexts. To do so, the code generator 138 may determine an optimal format supported for the destination application based on the destination context (e.g., by using a LMM, a generative language model, a machine learning model, and/or or a combination of models). In some embodiments, developers may include examples of source and destination transformations, which may be used by the code generator 138 to determine an optimal format. Additionally, or alternatively, few-shot prompting techniques may be used to include information about the particular transformation objective, which requires knowing in advance possible pairs of source and destination. In some embodiments, a RAG-like technique may also be used to retrieve the appropriate transformation template. Additionally, or alternatively, in some embodiments, the LMM may have encoded from the training data the specifics about the format of the source and destination applications and how to craft a transformation to go from one to the other.

The transformed data generator 140 is configured to execute the generated code for performing one or more transformations of the captured content. In some embodiments, it includes providing instructions to the LMM. To do so, the transformed data generator 140 obtains raw data of the captured content (e.g., directly from the OS clipboard). For example, the transformed data generator 140 can support all the formats supported by the OS clipboard: Text, RTF, HTML, and Image. It should be appreciated that other formats may be derived by the transformed data generator 140 as needed. For example, as described above, the LMM may have encoded in the training data the specifics about the format of the source and destination applications and can determine one or more appropriate formats. It should be appreciated that, in some embodiments, in some embodiments, execution of the generated code includes compilation or just-in-time (JIT) compilation of the generated code.

Additionally, the transformed data generator 140 is further configured to execute the generated code to parse the raw data and extract structured data based on the raw data and the user instruction. Since the raw data can be in different formats (e.g., HTML, CSV, space separated, string), the transformed data generator 140 is configured to first parse the raw data from the OS clipboard and extract the data contents into a simpler format (e.g., 2D array as illustrated in FIG. 6C). The format of the structured data is dynamically selected by the content management tool 130 based on the raw data as well as the user instruction. For example, for a data transfer task in which multiple tables are copied in the source application, the content management tool 130 may use an array of dictionaries as the structured format (e.g., [{'headers':[ . . . ], 'rows':[ . . . ]}, . . . ]).

The transformed data generator 140 is further configured to execute the generated code to extract metadata from the raw data. Metadata is a key-value store that is used to capture other auxiliary information from the raw data that is not captured by the structured data, such as colors and font formats. It should be appreciated that the transformed data generator 140 may select the keys and values, which itself could be another array or dictionary, to add to the metadata.

Finally, the transformed data generator 140 is configured to execute the generated code to generate one or more transformations performed on the raw data, the structured data, and/or the metadata. Transformations is also a key-value store that records all the transformations performed by the transformed data generator 140 on raw data, structured data, and/or metadata, thereby tracking all the data transformations associated with the captured content. To do so, the transformed data generator 140 is configured to utilize a large multi-modal model (LMM) (e.g., GPT4o) to generate the code to transform the captured content. In other words, instead of directly asking the LMM to transform the clipboard content (e.g., represented as strings), the transformed data generator 140 is configured to transform the captured content with the generated code to reduce the risk of LMM hallucinations and to support larger input data that may not fit into the LMM's context window. However, it should be appreciated that, in some embodiments, any generative language model, other type of machine learning model, or a combination of models may be used instead of or in addition to the LMM. In other words, based on the raw data, user instruction, and source and destination contexts, the transformed data generator 140 is configured to perform a series of transformations on the captured content to convert it to the format needed for the destination application. For example, the transformation may include adding or removing columns, adding conditional formatting, and/or transforming into the data representation of the destination application (e.g., data format supported by the destination application). It should be appreciated that, depending on resources, capabilities, and capacity of the computing device used to capture the content, the content may be transformed on the computing device 120 and/or the server 160.

The context object manager 142 is configured to generate and update a context object associated with the captured content. The context object includes the source and type of data, raw data, structured data, metadata, and transformations. In other words, the context object manager 142 internally organizes the data context in multiple formats (e.g., raw data, structured data, metadata, and transformations) inside the context object, in order to support the various data-format transformations needed for moving data between multiple applications. Additionally, the context object manager 142 is configured to temporarily store the context object associated with the captured content in a content object database. For example, the context object manager 142 is configured to retain the entire contexts and all transformations made until something new content is copied or captured. It should be appreciated that the content object database may be synchronized between multiple devices of the user, such that the user can capture and paste content from any of the user's computing devices. However, it should be appreciated that, in some aspects, the content object database may be a cloud-based content database that is shared between the multiple devices of the user.

As described above, moving data from one format to another often requires a series of programmatic transformations on the different data representations in the context object. These steps are often dependent on the context itself and hence, the content management tool 130 has to dynamically plan and execute these steps. To do so, in some embodiments, the content management tool 130 may be provided with a small set of composable tools that are used with the large multi-modal model (LMM) API. These tools give the content management tool 130 its own agency to select what portions of the content management tool's context to operate on as well as allow the content management tool 130 to execute the generated code, selectively use the file system, and paste the transformed data into the destination location. The content management tool 130 knows and understands the internal clipboard representation, and can use provided tools to selectively look at parts of data—this includes sampling structured data, or a particular stored value in the metadata or the transformation object stores. Some example tools include:

GetClipboardSummary: When invoked by the content management tool 130, this tool returns the summary of the clipboard data, which includes the type, source of the data, and a sample of the raw data (e.g., truncated to 10000 characters).

AddStructuredDataUsingCode: This tool takes a Python function generated by the LMM model, executes it in the sandbox environment, and adds the result to ContextObject ['structuredData']. The entire ContextObject is passed to the function as a parameter.

AddMetaData UsingCode: Similar to above, this tool takes a Python function, executes it and stores the result in ContextObject['metadata']['key']. 'key' is provided by the model.

sampleContextObject This tool is for the content management tool 130 to generate and execute Python code to sample, poll, or access parts of the data to understand the data context. The entire clipboard object is passed as an input parameter to the function.

AddTransformationUsingCode: Similar to above, this is used to generate a transformation by executing code and storing it in ContextObject['transformations']['key']. 'key' is provided by the model.

runPythonCode: This tool executes a Python function in the sandbox environment and returns the output object. The entire clipboard context object is passed as a parameter to this function.

write ToTempFile: The content management tool 130 can use this to write one of the transformations to a temporary file. The tool accepts a key, and a file extension ext. The tool will store the contents of ContextObject['transformations'] ['key'] to <tempfile>.ext.

paste ToDestination: This tool takes two parameters: key and contentType. The content type can either be text, HTML, or RTF. This tool will paste the contents of ContextObject['transformations']['key'] to the destination app. In case the paste to the destination app fails, the tool will insert the contents to the OS clipboard for the user to trigger the paste manually.

Additionally, not all data transfer tasks can be simply completed through copy-paste actions, especially for complex applications like a spreadsheet application. Recreating complex properties like setting datatypes or specifying column width can only be done by interacting with the application GUI. Such applications may thus have deeper integration with the content management tool 130. To support this deeper integration, the content management tool 130 may allow external applications to provide custom APIs by subscribing via web sockets. These APIs can allow content management tool 130 to gain more context surrounding the paste action, and also perform actions that are simply not possible with copy-paste. The content management tool 130 may be use the APIs when available, and may fall back to using copy-paste when such an API isn't available for a specific application.

Figure 2:
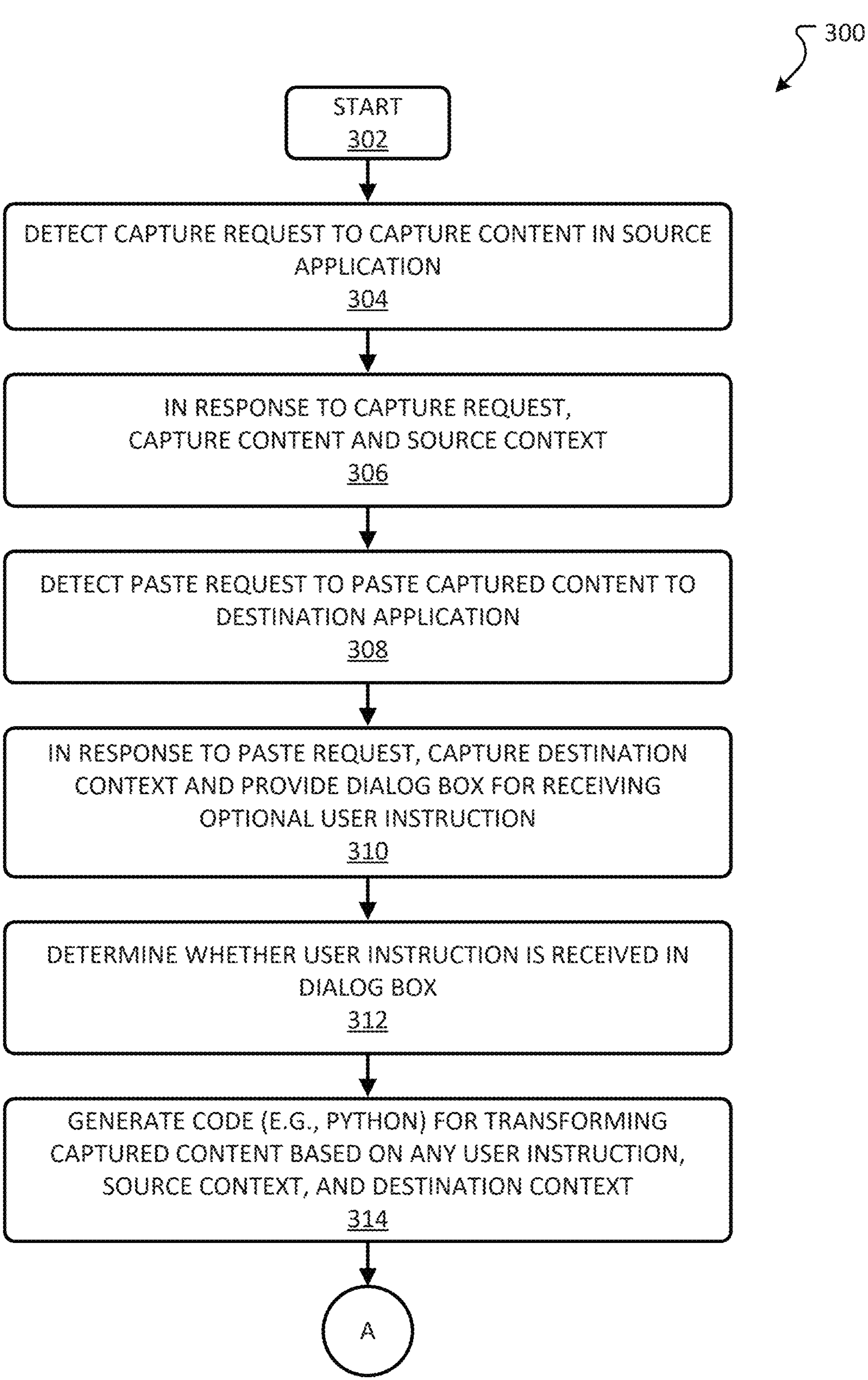
FIGS. 2 and 3 depict flowcharts of an example method of capturing and transforming content from a source application to a destination application in accordance with examples of the present disclosure.
Figure 3:
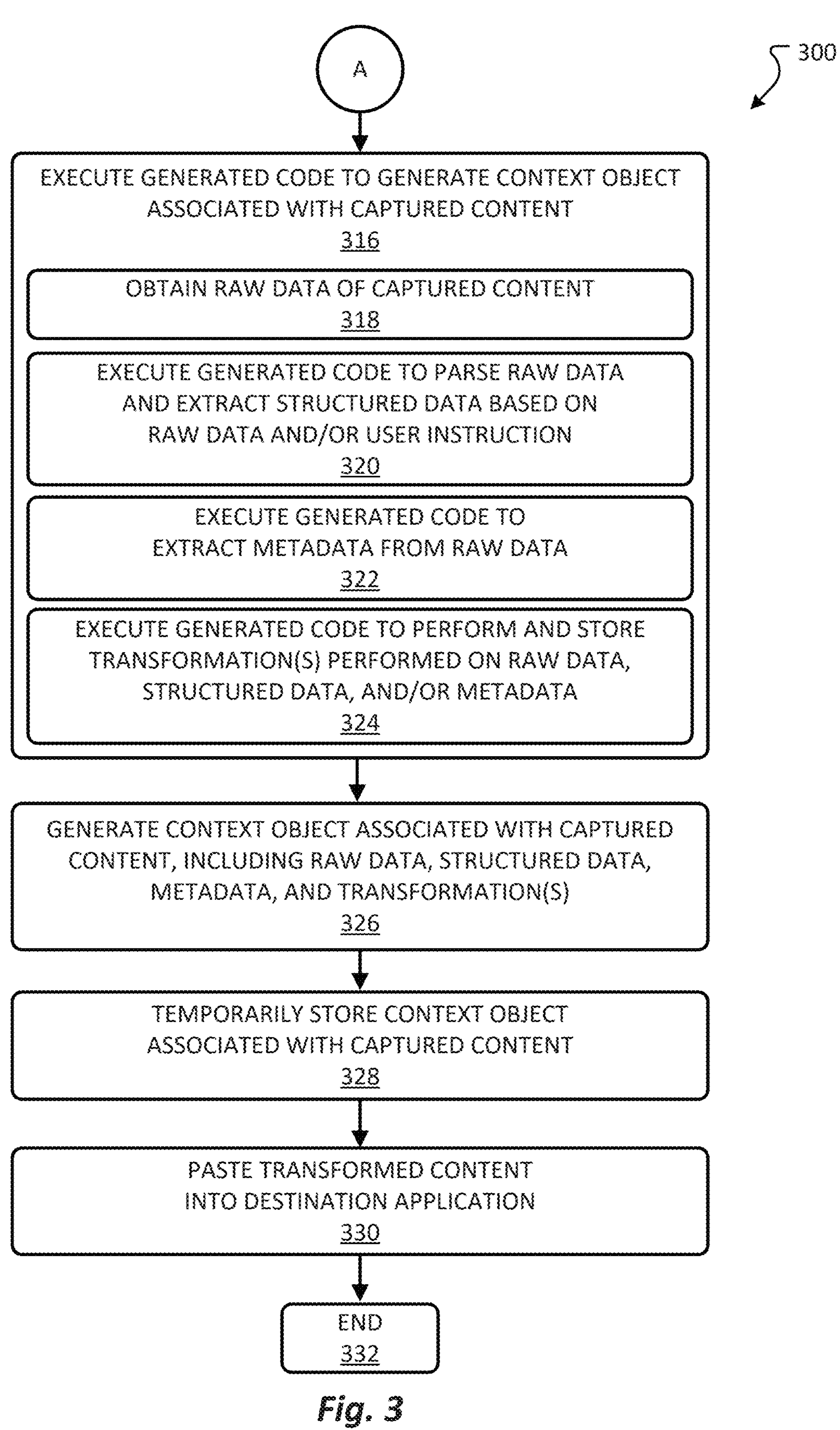

Referring now to FIGS. 2 and 3, a method 300 for capturing and transforming content from a source application to a destination application in accordance with examples of the present disclosure is provided. A general order for the steps of the method 300 is shown in FIGS. 2 and 3. Generally, the method 300 starts at 302 and ends at 332. The method 300 may include more or fewer steps or may arrange the order of the steps differently than those shown in FIGS. 2 and 3. In the illustrative aspect, the method 300 is performed by a computing device (e.g., a user device 120) of a user 110. However, it should be appreciated that one or more steps of the method 300 may be performed by another device (e.g., a server 160).

Specifically, in some aspects, the method 300 may be performed by a content management tool (e.g., 130) executed on the user device 120. For example, the computing device 120 may be, but is not limited to, a computer, a notebook, a laptop, a mobile device, a smartphone, a tablet, a portable device, a wearable device, or any other suitable computing device that is capable of executing a content management tool (e.g., 130). As described above, the content management tool 130 is integrated with or otherwise accesses the OS clipboard of the computing device 120. It should be appreciated that, in some embodiments, the content management tool 130 may be any productivity tool that integrates with the OS clipboard and has copy-and-paste and transformation functionalities. For example, the server 160 may be any suitable computing device that is capable of communicating with the computing device 120. The method 300 can be executed as a set of computer-executable instructions executed by a computer system and encoded or stored on a computer readable medium. Further, the method 300 can be performed by gates or circuits associated with a processor, Application Specific Integrated Circuit (ASIC), a field programmable gate array (FPGA), a system on chip (SOC), or other hardware device. Hereinafter, the method 300 shall be explained with reference to the systems, components, modules, software, data structures, user interfaces, etc. described in conjunction with FIGS. 1 and 7-9.

The method 300 starts at operation 302, where flow may proceed to 304. At operation 304, the content management tool 130 detects a capture request to capture content. The capture request is any indicator that represents a user intent to capture the content. The content may be one or more texts, documents, images, pictures, photos, videos, or audios. The capture request may be a shortcut and/or a gesture assigned by an operating system (OS) or by a user. For example, a keyboard shortcut for a content capture (e.g., ctrl-c) may be predefined by an operating system of a user's computing device and/or by a user. Additionally, or alternatively, the capture request may be invoked via a tool bar icon or a menu item (e.g., Edit>copy). Additionally, or alternatively, a voice shortcut for a content capture (e.g., "capture selected content") may be predefined by an operating system of a user's computing device and/or by a user. Additionally, or alternatively, a user may assign a gesture as a capture request. For example, a user may indicate that whenever the user takes a screenshot on the user's mobile device, the user wants the screenshot content to be captured.

At operation 306, in response to the capture request, the content management tool 130 captures the content and source context of the source application. As described above, the content management tool 130 is a context-aware tool that keeps track of application contexts for copy-paste actions. For example, the source context of the source application includes the name of the application, the icon, the process ID, or any relevant application information associated with the source application. Additionally, in some embodiments, upon detecting the capture request, a dialog box with an input area is presented to a user for receiving any additionally context related to the copied content and/or the source application.

At operation 308, the content management tool 130 detects a paste request to paste the captured content to a destination application. It should be appreciated that the destination application may be different from the source application where the content was originally copied from. For example, a user may copy content from a website and trigger the paste in an email application. Alternatively, the destination application and the source application may be the same application. For example, a user may copy content from a document and trigger the paste in the same document. In some embodiments, the paste request may be a shortcut and/or a gesture assigned by an operating system or by the user. For example, a keyboard shortcut for a content paste (e.g., ctrl-shift-v) may be predefined by an operating system of a user's computing device and/or by a user. Additionally, or alternatively, the paste request may be invoked via a tool bar icon or a menu item (e.g., Edit>paste). Additionally, or alternatively, a voice shortcut for a content capture (e.g., "paste content") may be predefined by an operating system of a user's computing device and/or by a user.

At operation 310, in response to the paste request, the content management tool 130 captures destination context of the destination application and provide a dialog box for receiving optional user instruction. The dialog box includes an input area for an optional instruction prompt. As described above, the content management tool 130 keeps track of the implicit context of the source application where the user copied the latest content data and the destination application where the paste was triggered. For example, the content management tool 130 may use Windows OS hooks to listen to copy and paste requests and track the destination context, such as the name of the application, the icon, the process ID, or any relevant application information associated with the destination application. As described further below, the source and destination contexts are used to determine the type of data copied and how to extract the structured data and metadata.

For example, when the user copies a table from a web page in a web browser application, the content management tool 130 is aware and keeps track of the application name of the web browser application, the tab name, etc. to allow the content management tool 130 to determine the raw data as HTML and appropriately extract the structured data. Subsequently, if the user triggers the paste in a LaTex editor application, the content management tool 130 will automatically determine that the LaTex editor application takes in LaTex format based on the destination application context and will transform the copied table in LaTex table.

At operation 312, the content management tool 130 determines whether user instruction is received in the dialog box. For example, the user may provide an instruction in natural language to transform the captured content. However, it should be appreciated that the user may not provide any user instruction.

At operation 314, the content management tool 130 generates code for transforming the captured content based on any user instruction, the source context, and the destination context. However, it should be appreciated that, in some embodiments, the content management tool 130 may plan and perform transformation, using code, tools, or a combination of both. As described above, in some examples, there may not be any user instruction. The generated code may be in any programming language (e.g., Python, C #, Typescript, etc.). As described further below, the code is executed to extract structure data and metadata associated with the captured content and perform one or more transformations. For example, one or more transformation functions are determined based on the user instruction and the source and destination contexts. To do so, the content management tool 130 may determine an optimal format supported for the destination application based on the destination context (e.g., by using a LMM, a generative language model, a machine learning model, and/or or a combination of models).

To make the context-aware content management tool 130, the content management tool 130 stores a superset of information (e.g., HTML tags, attributes from the spreadsheet application tables) besides the raw data from the source application around the data when "copy" is triggered, and the context is refined together with the destination contexts only when "paste" is triggered. By doing so, the content management tool 130 ensures that information (e.g., formatting and structural information) does not get lost upon copying, despite the fact that the content management tool 130 cannot anticipate where the captured content will be moved to and what metadata will be needed by the user and the destination application. With the merged contexts, the content management tool 130 utilizes a large multi-modal model (LMM) (e.g., GPT4o) to generate the code to transform the captured content. In other words, instead of directly asking the LMM to transform the clipboard content (e.g., represented as strings), the content management tool 130 transforms the captured content with the generated code to reduce the risk of LMM hallucinations and to support larger input data that may not fit into the LMM's context window. However, it should be appreciated that, in some embodiments, any generative language model, other type of machine learning model, or a combination of models may be used instead of or in addition to the LMM.

Subsequently, at operation 316 in FIG. 3, the content management tool 130 executes the generated code to generate a context object associated with the captured content. To do so, the content management tool 130 obtains raw data of the captured content as indicated in operation 318. In the illustrative embodiment, the content management tool 130 obtains the raw data of the captured content directly from the OS clipboard. As described above, in the illustrative embodiment, the content management tool 130 is integrates with or otherwise accesses the OS clipboard. As such, the content management tool 130 can support all the formats supported by the OS clipboard: Text, RTF, HTML, and Image. It should be appreciated that other formats may be derived by the content management tool 130 as needed.

At operation 320, the content management tool 130 executes the generated code to parse the raw data and extracts structured data based on the raw data and the user instruction. Since the raw data can be in different formats (e.g., HTML, CSV, space separated, string), the content management tool 130 first parses the raw data from the OS clipboard and extracts the data contents into a simpler format (e.g., 2D array as illustrated in FIG. 6C). The format of the structured data is dynamically selected by the content management tool 130 based on the raw data as well as the user instruction. For example, for a data transfer task in which multiple tables are copied in the source application, the content management tool 130 may use an array of dictionaries as the structured format (e.g., [{'headers': [ . . . ], 'rows':[ . . . ]}, . . . ]).

At operation 322, the content management tool 130 executes the generated code to extract metadata from the raw data. Metadata is a key-value store that is used to capture other auxiliary information from the raw data that is not captured by the structured data, such as colors and font formats. It should be appreciated that the content management tool 130 may select the keys and values, which itself could be another array or dictionary, to add to the metadata.

At operation 324, the content management tool 130 executes the generated code to perform one or more transformations performed on the raw data, the structured data, and/or the metadata. Transformations is also a key-value store that records all the transformations performed by the content management tool 130 on raw data, structured data, and/or metadata, thereby tracking all the data transformations associated with the captured content. In other words, based on the raw data, user instruction, and source and destination contexts, the content management tool 130 performs a series of transformations on the captured content to convert it to the format needed for the destination application. For example, the transformation may include adding or removing columns, adding conditional formatting, and/or transforming into the data representation of the destination application (e.g., data format supported by the destination application). As an example, FIG. 6E illustrates the 2D array structured data from FIG. 6C is transformed as a string representing the corresponding LaTex table to be paste into the destination application, a LaTex editor. In other words, to generate the data representations and transformations, the content management tool 130 generates the code to programmatically extract and transform the captured content, rather than directly generating the new data.

Subsequently, at operation 326, the content management tool 130 generates a context object associated with the captured content. The context object includes the source and type of data, raw data, structured data, metadata, and transformations. In other words, the content management tool 130 internally organizes the data context in multiple formats (e.g., raw data, structured data, metadata, and transformations) inside the context object, in order to support the various data-format transformations needed for moving data between multiple applications.

At operation 328, the content management tool 130 temporarily stores the context object associated with the captured content in a content object database. For example, the content management tool 130 retains the entire contexts and all transformations made until something new content is copied or captured. At operation 330, the content management tool 130 pastes the transformed content into the destination application. As described above, in some embodiments, the content management tool 130 may generate code and invoke application specific APIs to paste the transformed content into the destination application. Subsequently, the method 300 may end at 332.

In some embodiments, subsequent to the paste, the content management tool 130 may receive another paste request at the same or a different destination application. As described above, since the context object associated with the captured content is stored, users can simply follow up by pasting again with revised instructions, allowing the content management tool 130 to access the full contexts for additional transformations. For example, if the user wishes to replace or modify the existing paste, they can select the pasted data and re-trigger the paste command with updated instructions. By doing so, the content management tool 130 will paste the updated data based on the updated instructions and automatically overwriting the existing pasted data. In such embodiments, the method 300 loops back to the operation 310 to capture the new destination context and generate a new code for transforming the captured content.

Figure 4B:
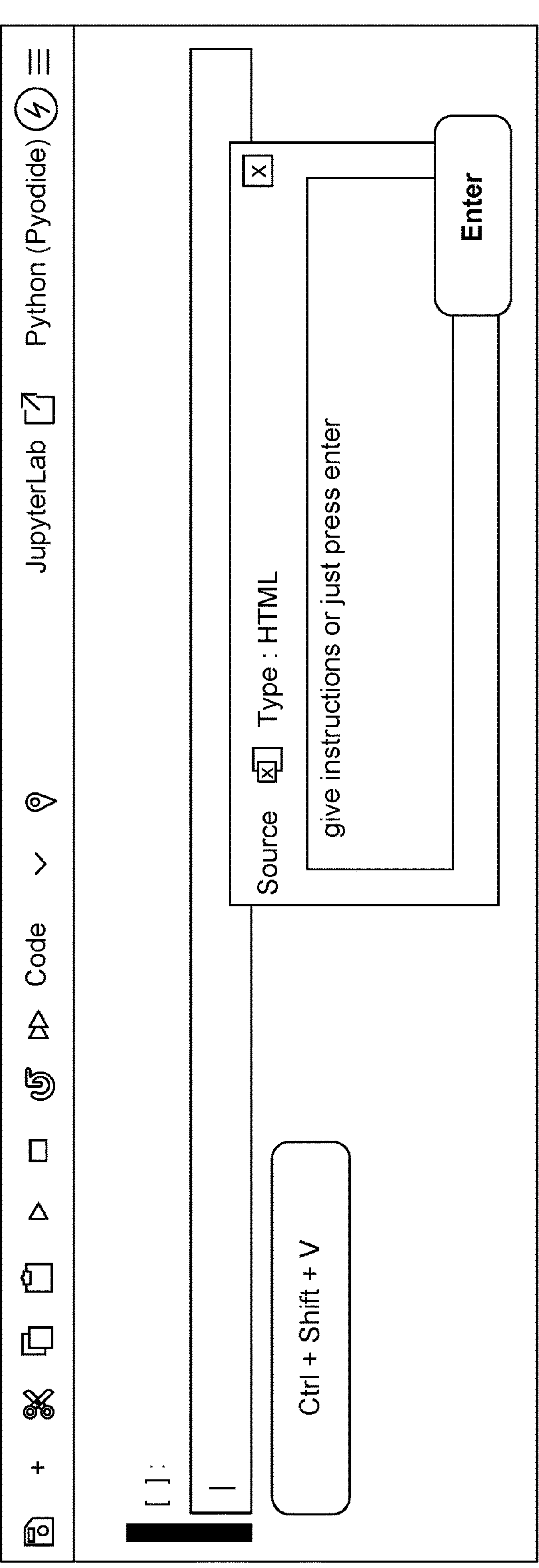

FIGS. 4A-4D illustrate exemplary screenshots of the content management tool 130 that includes user interface elements for interacting with a user. In the illustrative example, a user is working with study data that the user wants to analyze and write an academic paper on the findings. This workflow of the user requires multiple steps-data cleaning, data analysis and aggregation, and report generation. Since these steps require different processes, the user wanted to use the tools that she liked best for each of the steps. As illustrated in FIG. 4A, the user opens the data in the spreadsheet application since it allows the user to easily spot and correct spelling and typing errors directly in the cells. Once the data is clean, the user wants to move to an open-source web notebook application (e.g., Python notebook) to use an open-source data analysis and manipulation tool (e.g., Python data analysis library), a familiar library, to manipulate and aggregate the study data. After computing a summary table in the open-source web notebook application, the user plans to move this table into her document in a LaTex editor application for her paper.

However, the user's seemingly simple three-step workflow becomes complicated because the tools do not seamlessly interact. Moving data from a spreadsheet application to an open-source web notebook application requires downloading the data as a CSV file, writing Python code to load the CSV file as a dataframe of the open-source data analysis and manipulation tool, and formatting the dataframe to be ready to use (e.g., fixing the index and converting the data to the right type). Then, copying the summary table from the open-source web notebook application to the LaTex editor application introduces another challenge, as the user needs to convert the HTML table into Latex format, which usually requires the user to manually enter it.

Figures 4C, 4D:
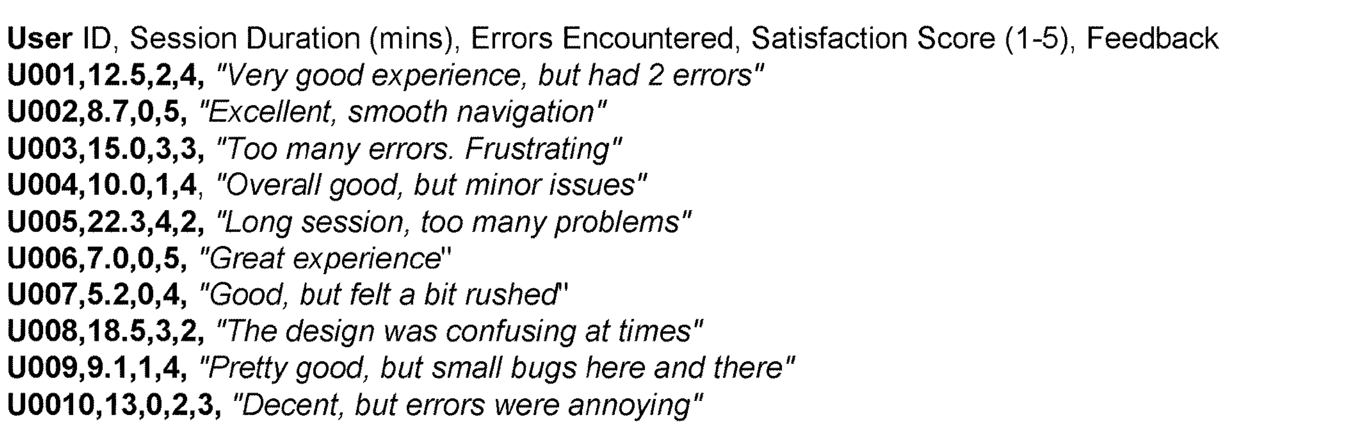

As shown in FIGS. 4A-4D, the content management tool 130 allows the user to transfer the corrected data from the spreadsheet application to the open-source web notebook application by simply copying the entire data table from a spreadsheet application. The user then triggers a smart paste (e.g., ctrl-shift-v) in the open-source web notebook application without any explicit instructions (e.g., as shown in FIG. 4B). In response, the content management tool 130 automatically detects that the user intends to move data from the spreadsheet application to the open-source web notebook application. The content management tool 130 converts the clipboard's spreadsheet data into a CSV format, saves it as a temporary file (e.g., as shown in FIG. 4C), and then automatically pastes the Python code to load the CSV file into the dataframe (e.g., as shown in FIG. 4D).

FIGS. 5A and 5B illustrate exemplary screenshots of the content management tool 130 that includes user interface elements for interacting with a user. In the illustrative example, a user receives an email attachment from the user's teaching assistant with each student's scores for all the assignments in a Markdown (MD) file exported from the popular note-taking app Obsidian. As illustrated in FIG. 5A, the scores are listed in a long format, sorted by assignment. To simplify summary calculations, the user needs to convert the data to a wide format. As the user's spreadsheet application may not be able to import Markdown directly, the user must either input the scores manually or find an online converter to transform the MD file into a CSV. Then, the user can pivot the table in the spreadsheet application to change it from a long to a wide format.

However, instead of moving the table from markdown to the spreadsheet application to perform the pivot, the user can simply copy the markdown table and asks the content management tool 130 to paste the table with the following instructions: "Pivot the table from long to wide format", as illustrated in FIG. 5A. Subsequently, the content management tool 130 performed the pivot operation successfully and directly pasted the data in markdown without having the user to switch to the spreadsheet application entirely, as shown in FIG. 5B.

Referring now to FIGS. 6A-F illustrate exemplary screenshots of the content management tool 130 that includes user interface elements for interacting with a user. As described above, the content management tool 130 is configured to perform a series of transformations on the captured content to convert it to the format needed for a destination application.

In the illustrative example, a user is copying an HTML table, as shown in FIG. 6A, and pasting it to a LaTex editor. The content management tool 130 first extracts the structured data from the HTML table by executing Python code, as illustrated in FIG. 6B, and the extracted structured data is stored as a 2D array, as illustrated in FIG. 6C. To put it differently, FIG. 6B shows the Python code generated by the content management tool 130 (e.g., by an LMM according to aspects described herein) to parse the HTML table in FIG. 6A into a structured 2D Python dataframe shown in FIG. 6C using the BeautifulSoup package. By generating and executing the code to generate data transformations, the content management tool 130 can operate on tables that may not fit fully into the AI model's context window as well as reduces the chance of the model hallucinating the data it generates.

The content management tool 130 then generates code to transform the structured data into a LaTex table, as illustrated in FIG. 6D. The transformed LaTex code is stored in the context object, as illustrated in FIG. 6E. The final LaTex code is then pasted into the destination application, as illustrated in FIG. 6F.

Figure 7:
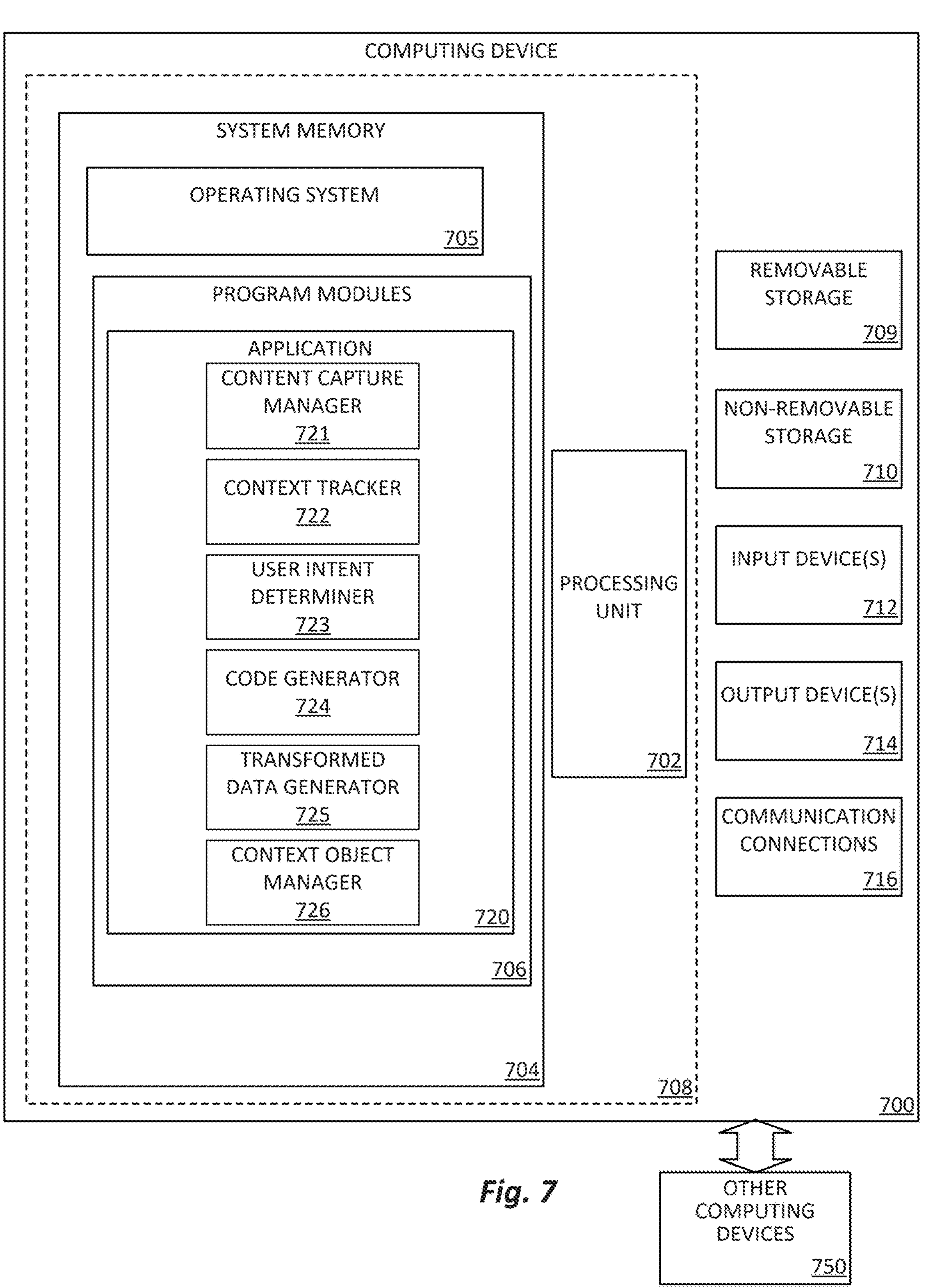
FIG. 7 is a block diagram illustrating example physical components of a computing device with which aspects of the disclosure may be practiced.
Figure 8:
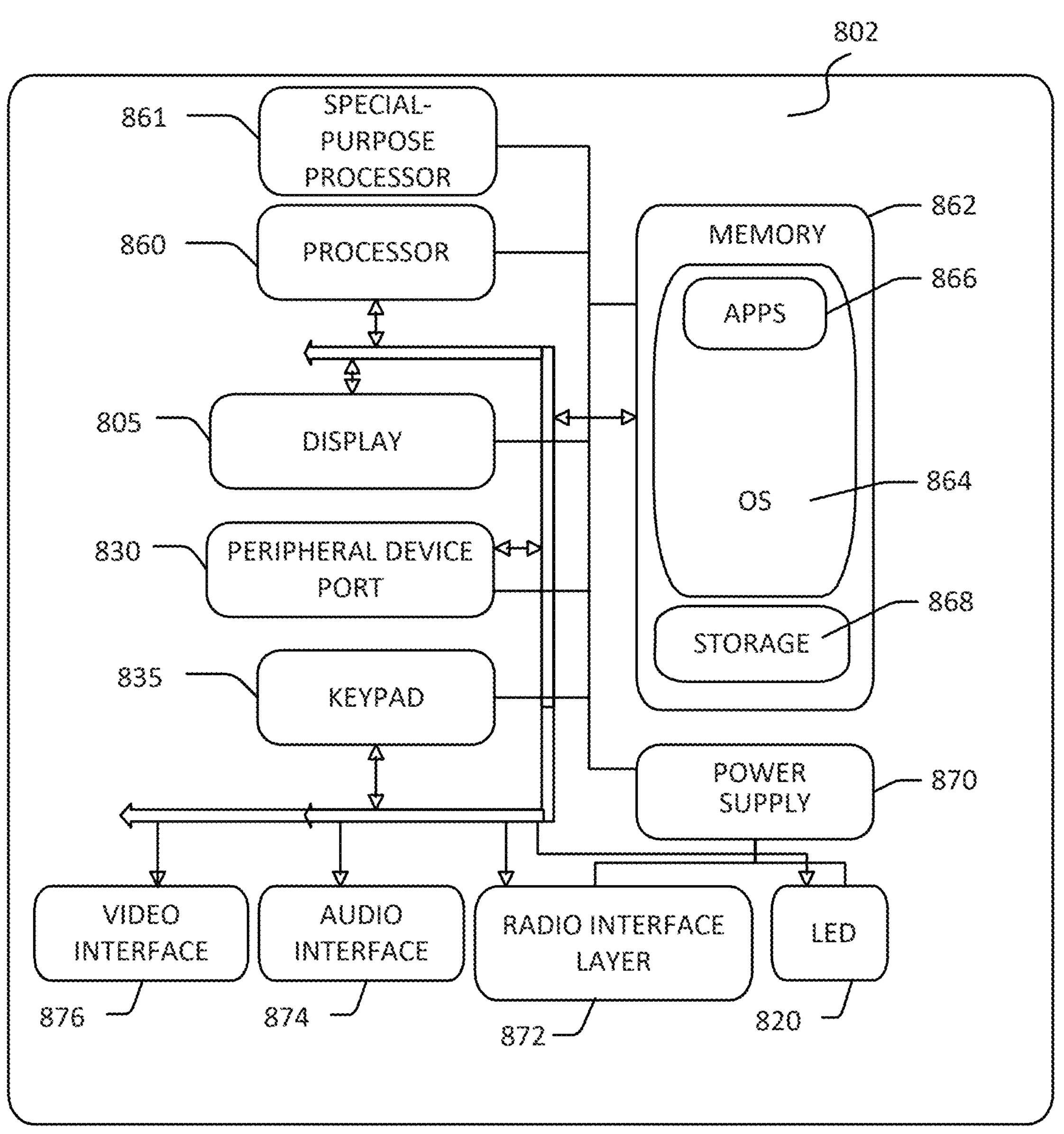
FIG. 8 is a simplified block diagram of a computing device with which aspects of the present disclosure may be practiced.
Figure 9:
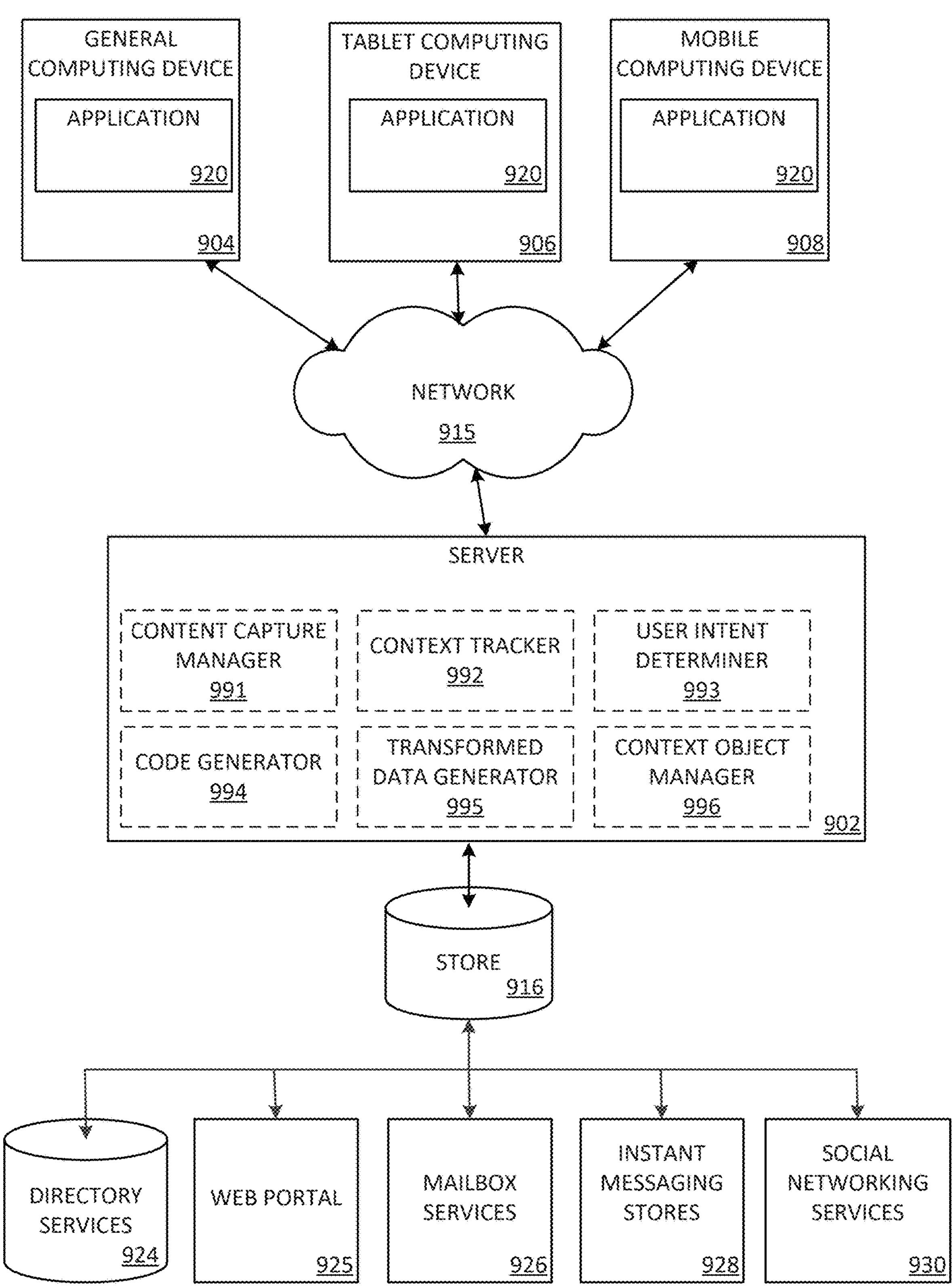
FIG. 9 is a simplified block diagram of a distributed computing system in which aspects of the present disclosure may be practiced.

FIGS. 7-9 and the associated descriptions provide a discussion of a variety of operating environments in which aspects of the disclosure may be practiced. However, the devices and systems illustrated and discussed with respect to FIGS. 7-9 are for purposes of example and illustration and are not limiting of a vast number of computing device configurations that may be utilized for practicing aspects of the disclosure, described herein.

FIG. 7 is a block diagram illustrating physical components (e.g., hardware) of a computing device 700 with which aspects of the disclosure may be practiced. The computing device components described below may be suitable for the computing devices described above, including one or more devices associated with machine learning service (e.g., productive platform server 160), as well as computing device 140 discussed above with respect to FIG. 1. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories.

The system memory 704 may include an operating system 705 and one or more program modules 706 suitable for running software application 720, such as one or more components supported by the systems described herein. As examples, system memory 704 may store a content capture manager 721, a context tracker 722, a user intent determiner 723, a code generator 724, a transformed data generator 725, and/or a context object manager 726. The operating system 705, for example, may be suitable for controlling the operation of the computing device 700.

Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., application 720) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 8 illustrates a system 800 that may, for example, be a mobile computing device, such as a mobile telephone, a smart phone, wearable computer (such as a smart watch), a tablet computer, a laptop computer, and the like, with which aspects of the disclosure may be practiced. In one example, the system 800 is implemented as a "smart phone" capable of running one or more applications (e.g., browser, e-mail, calendaring, contact managers, messaging clients, games, and media clients/players). In some aspects, the system 800 is integrated as a computing device, such as an integrated personal digital assistant (PDA) and wireless phone.

In a basic configuration, such a mobile computing device is a handheld computer having both input elements and output elements. The system 800 typically includes a display 805 and one or more input buttons that allow the user to enter information into the system 800. The display 805 may also function as an input device (e.g., a touch screen display).

If included, an optional side input element allows further user input. For example, the side input element may be a rotary switch, a button, or any other type of manual input element. In alternative aspects, system 800 may incorporate more or less input elements. For example, the display 805 may not be a touch screen in some aspects. In another example, an optional keypad 835 may also be included, which may be a physical keypad or a "soft" keypad generated on the touch screen display.

In various aspects, the output elements include the display 805 for showing a graphical user interface (GUI), a visual indicator (e.g., a light emitting diode 820), and/or an audio transducer 825 (e.g., a speaker). In some aspects, a vibration transducer is included for providing the user with tactile feedback. In yet another aspect, input and/or output ports are included, such as an audio input (e.g., a microphone jack), an audio output (e.g., a headphone jack), and a video output (e.g., a HDMI port) for sending signals to or receiving signals from an external device.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 800 also includes a non-volatile storage area 868 within the memory 862. The non-volatile storage area 868 may be used to store persistent information that should not be lost if the system 800 is powered down. The application programs 866 may use and store information in the non-volatile storage area 868, such as e-mail or other messages used by an e-mail application, and the like. A synchronization application (not shown) also resides on the system 800 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the system 800 described herein (e.g., a content capture manager, a content transformer, etc.).

The system 800 has a power supply 870, which may be implemented as one or more batteries. The power supply 870 might further include an external power source, such as an AC adapter or a powered docking cradle that supplements or recharges the batteries.

The system 800 may also include a radio interface layer 872 that performs the function of transmitting and receiving radio frequency communications. The radio interface layer 872 facilitates wireless connectivity between the system 800 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated example, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 800 may further include a video interface 876 that enables an operation of an on-board camera 830 to record still images, video stream, and the like.

It will be appreciated that system 800 may have additional features or functionality. For example, system 800 may also include additional data storage devices (removable and/or non-removable) such as, magnetic disks, optical disks, or tape. Such additional storage is illustrated in FIG. 8 by the non-volatile storage area 868.

Data/information generated or captured and stored via the system 800 may be stored locally, as described above, or the data may be stored on any number of storage media that may be accessed by the device via the radio interface layer 872 or via a wired connection between the system 800 and a separate computing device associated with the system 800, for example, a server computer in a distributed computing network, such as the Internet. As should be appreciated, such data/information may be accessed via the radio interface layer 872 or via a distributed computing network. Similarly, such data/information may be readily transferred between computing devices for storage and use according to any of a variety of data/information transfer and storage means, including electronic mail and collaborative data/information sharing systems.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, various documents may be stored using a directory service 924, a web portal 925, a mailbox service 926, an instant messaging store 928, or a social networking site 930.

An application 920 (e.g., similar to the application 720) may be employed by a client that communicates with server device 902. Additionally, or alternatively, a content capture manager 991, a context tracker 992, a user intent determiner 993, a code generator 994, a transformed data generator 995, and/or a context object manager 996 may be employed by server device 902. The server device 902 may provide data to and from a client computing device such as a personal computer 904, a tablet computing device 906 and/or a mobile computing device 908 (e.g., a smart phone) through a network 915. By way of example, the computer system described above may be embodied in a personal computer 904, a tablet computing device 906 and/or a mobile computing device 908 (e.g., a smart phone). Any of these examples of the computing devices may obtain content from the store 916, in addition to receiving graphical data useable to be either pre-processed at a graphic-originating system, or post-processed at a receiving computing system.

It will be appreciated that the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The example systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the example aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Example hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

In accordance with at least one example of the present disclosure, a method for capturing and transforming content from a source application to a destination application is provided. The method may include detecting a capture request to capture content from a source application, in response to the capture request, capturing the content and source context associated with the source application, detecting a paste request to paste captured content to a destination application, in response to the paste request, capturing destination context associated with the destination application, generating code for transforming the captured content based at least upon the source context and the destination context, executing the generated code to transform the captured content, and providing the transformed content into the destination application.

In accordance with at least one aspect of the above method, the method may further include in response to the paste request, providing a dialog box for display to a user for receiving a user instruction, wherein generating the code for transforming the captured content comprises generating the code for transforming the captured content based at least upon the source context, the destination context, and the user instruction.

In accordance with at least one aspect of the above method, the method may further include generating a context object associated with the captured content, wherein the context object includes raw data, structured data, metadata, and transformation store.

In accordance with at least one aspect of the above method, the method may further include temporarily storing the context object in association with the captured content.

In accordance with at least one aspect of the above method, the method may include where executing the generated code to transform the captured content comprises executing the generated code to: obtain raw data of the captured content, parse the raw data to extract structured data, extract metadata based on the raw data and the user instruction, perform one or more transformations on the raw data, the structured data, and/or the metadata, and generate a transformation store including the one or more transformations.

In accordance with at least one aspect of the above method, the method may include where to obtain the raw data of the captured content comprises to obtain the raw data of the captured content from a clipboard of an operating system.

In accordance with at least one aspect of the above method, the method may include where a format of the structured data is selected based on the raw data and the user instruction.

In accordance with at least one aspect of the above method, the method may include where the metadata is a key-value store that includes auxiliary information from the raw data that is not included in the structured data.

In accordance with at least one aspect of the above method, the method may include where the transformation store is a key-value store that records the one or more transformations on the raw data.

In accordance with at least one aspect of the above method, the method may include where to perform one or more transformations comprises to apply the one or more transformations using at least one of: a multi-modal model, a generative language model, a transformer model, or a diffusion model.

In accordance with at least one aspect of the above method, the method may include where the destination application is different from the source application.

In accordance with at least one aspect of the above method, the method may include where the destination application is the same as the source application.

In accordance with at least one aspect of the above method, the method may include where executing the generated code to transform the captured content includes compiling the generated code into compiled code and executing the compiled code.

In accordance with at least one example of the present disclosure, a computing device for capturing and transforming content from a source application to a destination application is provide. The computing device comprising a processor and a memory having a plurality of instructions stored thereon that, when executed by the processor, causes the computing device to detect a capture request to capture content from a source application, in response to the capture request, capture the content and source context associated with the source application, detect a paste request to paste captured content to a destination application, in response to the paste request, capture destination context associated with the destination application, generate code for transforming the captured content based at least upon the source context and the destination context, execute the generated code to transform the captured content, and provide the transformed content into the destination application.

In accordance with at least one aspect of the above computing device, the computing device may be configured to in response to the paste request, provide a dialog box for display to a user for receiving a user instruction, wherein to generate the code for transforming the captured content comprises to generate the code for transforming the captured content based at least upon the source context, the destination context, and the user instruction.

In accordance with at least one aspect of the above computing device, the computing device may be configured to generate a context object associated with the captured content, wherein the context object includes raw data, structured data, metadata, and transformation store, and temporarily store the context object in association with the captured content.

In accordance with at least one aspect of the above computing device, the computing device may comprise where to execute the generated code to transform the captured content comprises to execute the generated code to: obtain raw data of the captured content, parse the raw data to extract structured data, extract metadata based on the raw data and the user instruction, perform one or more transformations on the raw data, the structured data, and/or the metadata, and generate a transformation store including the one or more transformations.

In accordance with at least one aspect of the above computing device, the computing device may comprise where a format of the structured data is selected based on the raw data and the user instruction, wherein the metadata is a key-value store includes auxiliary information from the raw data that is not included in the structured data, and wherein the transformation store is a key-value store that records the one or more transformations on the raw data.

In accordance with at least one example of the present disclosure, a computer-readable medium storing instructions for capturing and transforming content from a source application to a destination application is provided. The instructions when executed by one or more processors of a computing device, cause the computing device to: detect a capture request to capture content from a source application, in response to the capture request, capture the content and source context associated with the source application, detect a paste request to paste captured content to a destination application, in response to the paste request, capture destination context associated with the destination application, generate code for transforming the captured content based at least upon the source context and the destination context, execute the generated code to transform the captured content, and provide the transformed content into the destination application.

In accordance with at least one aspect of the above non-transitory computer-readable medium, the instructions when executed by one or more processors of a computing device may further cause the computing device to in response to the paste request, provide a dialog box for display to a user for receiving a user instruction, wherein to generate the code for transforming the captured content comprises to generate the code for transforming the captured content based at least upon the source context, the destination context, and the user instruction.

In accordance with at least one aspect of the above non-transitory computer-readable medium, the instructions when executed by one or more processors of a computing device may further cause the computing device to generate a context object associated with the captured content, wherein the context object includes the raw data, the structured data, the metadata, and the transformation store, and temporarily store the context object in association with the captured content, wherein to execute the generated code to transform the captured content comprises to execute the generated code to: obtain raw data of the captured content, parse the raw data to extract structured data, extract metadata based on the raw data and the user instruction, perform one or more transformations on the raw data, the structured data, and/or the metadata, and generate a transformation store including the one or more transformations.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

What is claimed is:

1. A method for capturing and transforming content from a source application to a destination application, the method comprising:

detecting a capture request to capture content from a source application;

in response to the capture request, capturing the content and source context associated with the source application;

detecting a paste request to paste captured content to a destination application;

in response to the paste request, capturing destination context associated with the destination application;

generating transformation instructions for transforming the captured content based at least upon the source context and the destination context;

implementing the transformation instructions to transform the captured content, wherein implementing the transformation instructions to transform the captured content comprises:

obtaining raw data of the captured content;

parsing the raw data to extract structured data;

extracting metadata based on the raw data and a user instruction; and performing one or more transformations on the raw data, the structured data, and/or the metadata; and providing the transformed content into the destination application.

2. The method of claim 1, further comprising:

in response to the paste request, providing a dialog box for display to a user for receiving the user instruction, wherein generating the code-transformation instructions for transforming the captured content comprises generating the transformation instructions for transforming the captured content based at least upon the source context, the destination context, and the user instruction.

3. The method of claim 1, further comprising:

generating a context object associated with the captured content, wherein the context object includes the raw data, the structured data, the metadata, and a transformation store.

4. The method of claim 3, further comprising:

temporarily storing the context object in association with the captured content.

5. The method of claim 1, wherein the destination application is different from the source application.

6. The method of claim 1, wherein:

the transformation instructions include generated code; and executing the generated code to transform the captured content includes compiling the generated code into compiled code and executing the compiled code.

7. The method of claim 1, wherein obtaining the raw data of the captured content comprises obtaining the raw data of the captured content from a clipboard of an operating system.

8. The method of claim 1, wherein a format of the structured data is selected based on the raw data and the user instruction.

9. The method of claim 1, wherein the metadata is a key-value store that includes auxiliary information from the raw data that is not included in the structured data.

10. The method of claim 1, wherein:

the method further comprises generating a transformation store including the one or more transformations; and the transformation store is a key-value store that records the one or more transformations on the raw data.

11. The method of claim 1, wherein performing the one or more transformations comprises applying the one or more transformations using at least one of: a multi-modal model, a generative language model, a transformer model, or a diffusion model.

12. The method of claim 11, wherein:

the one or more transformations are applied using the generative language model; and the transformation instructions include a prompt that the generative language model receives as input.

13. A computing device for capturing and transforming content from a source application to a destination application, the computing device comprising:

a processor; and a memory having a plurality of instructions stored thereon that, when executed by the processor, causes the computing device to:

detect a capture request to capture content from a source application;

in response to the capture request, capture the content and source context associated with the source application;

detect a paste request to paste captured content to a destination application;

in response to the paste request, capture destination context associated with the destination application;

generate transformation instructions for transforming the captured content based at least upon the source context and the destination context;

implement the transformation instructions to transform the captured content at least in part by:

obtaining raw data of the captured content;

parsing the raw data to extract structured data;

extracting metadata based on the raw data and a user instruction; and performing one or more transformations on the raw data, the structured data, and/or the metadata; and provide the transformed content into the destination application.

14. The computing device of claim 13, wherein the plurality of instructions, when executed, further cause the computing device to:

in response to the paste request, provide a dialog box for display to a user for receiving the user instruction, wherein generating the transformation instructions for transforming the captured content comprises generating the transformation instructions for transforming the captured content based at least upon the source context, the destination context, and the user instruction.

15. The computing device of claim 13, wherein the plurality of instructions, when executed, further cause the computing device to:

generate a context object associated with the captured content, wherein the context object includes the raw data, the structured data, the metadata, and a transformation store; and temporarily store the context object in association with the captured content.

16. The computing device of claim 13, wherein the transformation instructions include generated code for transforming the captured content.

17. The computing device of claim 15, wherein a format of the structured data is selected based on the raw data and the user instruction, wherein the metadata is a key-value store includes auxiliary information from the raw data that is not included in the structured data, and wherein the transformation store is a key-value store that records the one or more transformations on the raw data.

18. A computer-readable medium storing instructions for capturing and transforming content from a source application to a destination application, the instructions when executed by one or more processors of a computing device, cause the computing device to:

detect a capture request to capture content from a source application;

in response to the capture request, capture the content and source context associated with the source application;

detect a paste request to paste captured content to a destination application;

in response to the paste request, capture destination context associated with the destination application;

generate transformation instructions for transforming the captured content based at least upon the source context and the destination context;

implement the transformation instructions to transform the captured content at least in part by:

obtaining raw data of the captured content;

parsing the raw data to extract structured data;

extracting metadata based on the raw data and a user instruction; and performing one or more transformations on the raw data, the structured data, and/or the metadata; and provide the transformed content into the destination application.

19. The computer storage medium of claim 18, wherein the instructions when executed by the one or more processors further cause the computing device to:

in response to the paste request, provide a dialog box for display to a user for receiving the user instruction, wherein generating the transformation instructions for transforming the captured content comprises generating the transformation instructions for transforming the captured content based at least upon the source context, the destination context, and the user instruction.

20. The computer storage medium of claim 18, wherein the instructions when executed by the one or more processors further cause the computing device to:

generate a context object associated with the captured content, wherein the context object includes the raw data, the structured data, the metadata, and a transformation store; and temporarily store the context object in association with the captured content.

* * * * *